Patented Aug. 7, 1951

2,563,144

UNITED STATES PATENT OFFICE 2,563,144

TERTIARY-HYDROXY-ALKYLAMINO-ANTHRAQUINONES

Richard S. Wilder, Penns Grove, N. J., assignor to Publicker Industries Inc., Philadelphia, Pa., a corporation of Pennsylvania No Drawing. Application October 4, 1947, Serial No. 778,025

6 Claims. (Cl. 260—379)

The present invention relates to novel compositions of matter and more particularly, it is concerned with derivatives of the anthraquinone series; specifically, tertiary-hydroxyalkylaminoanthraquinones having valuable properties as dyestuffs and as intermediates in the manufacture of dyestuffs. These compositions may be further identified by the following general structural formula:

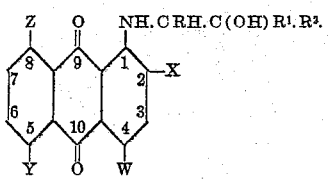

in which in the radical $NH.CRH.C(OH)R^1.R^2$ the substituent R may be either —H or an alkyl group of from 1 to 4 carbon atoms, the substituents $R^1$ and $R^2$ may be either alkyl, aryl or aralkyl, and $R^1$ and $R^2$ combined complete a cycloaliphatic ring, W may be —$NH_2$, —OH, —H, halogen, alkoxy, $R^3NH$— wherein $R^3$ represents a radical of the group alkyl, aryl and aralkyl, and the group —$NH.CRH.C(OH)R^1.R^2$ in which the values for R, $R^1$ and $R^2$ are the same as defined above, X may be a radical such as halogen, —H and sulfo, Y may be either —H, —OH, —$NH_2$ or sulfo, and Z may be —H or —OH.

Broadly, it may be said that the compounds embodied by the present invention are dyestuffs of the anthraquinone series in which the anthraquinone nucleus is substituted in at least one position of said nucleus at positions 1 and 4 thereof by the grouping $(-NH.CRH.C(OH)R^1R^2)_n$ wherein $n$ is an integer less than 3, and the values for the substituents R, $R^1$, and $R^2$ are the same as previously defined.

Anthraquinone dyes contemplated by my invention and which are represented by the above general formula are 1-[N-(1,2-dimethyl-2 - hydroxy)propyl]amino anthraquinone, 1-[N-1,2 - dimethyl - 2 - hydroxy)butyl]amino anthraquinone, 1-[N-(1,2,3-trimethyl-2-hydroxy)-pentyl] amino anthraquinone, 1-[N-(1-methyl-2-benzyl-2-hydroxy)propyl] amino anthraquinone, 1-[N-(2-phenyl-2-hydroxy)pentyl] amino anthraquinone, 5-hydroxy-1,4-di-[N-1-methyl-2-benzyl-2-phenyl-2-hydroxy)ethyl] amino anthraquinone, 1 - N-methylamino-4-[N - 1,2 - dimethyl - 2 - hydroxy)propyl] amino anthraquinone, 1-amino-2-sulfo - 4-[N-(1,2 - dimethyl-2-hydroxy)propyl] amino anthraquinone, 1-[N-(1,2,4-trimethyl-2-hydroxy) - pentyl]amino anthraquinone, 1 - amino-2-bromo - 5 - sulfo-4-[N-(1,2,3-trimethyl - 2 - hydroxy)pentyl]amino anthraquinone, 1-amino-4-[N-(1,2-dimethyl-2-hydroxy)propyl]amino anthraquinone, 1-N-methylamino-4-[N-(1,2 - dimethyl-2-hydroxy)butyl]-amino anthraquinone, 5-hydroxy-1,4-di-[N-(1,-2 - dimethyl-2-hydroxy)butyl]amino anthraquinone, 1,4 - di-[N-(1,2 - dimethyl - 2 - hydroxy)-propyl]amino anthraquinone, 1 - amino - 2,5-disulfo-4-[N-(1,2-dimethyl - 2 - hydroxy)propyl]-amino anthraquinone, 1-[N-(1,2,3-trimethyl-2-hydroxy pentyl]-4-[(1,5 - dimethyl-5-hydroxy)-hexyl]amino anthraquinone, 5-sulfo-1-[N-(1,5-dimethyl - 5 - hydroxy)hexyl]amino anthraquinone, 2-sulfo-5-hydroxy-1-[N-(1,2-dimethyl-2-hydroxy)propyl]amino anthraquinone, 1 - hydroxy-4 - [N-(1 - methyl-2-hydroxy-2,2 - pentamethylene)-ethyl]amino anthraquinone 2-sulfo-5-amino - 1 - [N - (1,2 - dimethyl - 2 - hydroxy)-propyl]amino anthraquinone, and the like.

I have found that anthraquinone derivatives having highly valuable and unusually desirable properties may be prepared by reacting a suitable compound of the anthraquinone series with an amino alcohol of the general formula

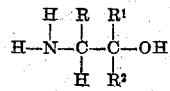

in which R represents an alkyl group having from 1 to 4 carbon atoms and $R^1$ and $R^2$ may represent alkyl, aralkyl or aryl groups and R and $R^1$ combined may complete a cycloaliphatic ring.

The new compounds of my invention are distinguished structurally from similar dyestuffs previously prepared inasmuch as such compounds contain a tertiary carbinol group adjacent to the carbon atom to which the amine group is attached, whereas the alkylolamino anthraquinones previously described contain primary or secondary carbinol groupings. Additionally, the dyestuffs of my invention are superior to related compounds previously synthesized inasmuch as they exhibit greater tinctorial strength, they possess better light fastness, and exhaust from the dyebath with unusual facility. Moreover, the dyestuffs of the present invention when applied to various fabrics are highly resistant to washing and sublimation.

The new tertiary-hydroxyalkylamino-anthraquinones of my invention can be prepared in a variety of ways; however, in general, I prefer to prepare these compounds by reacting a suitable anthraquinone, containing in alpha position one or more replaceable radicals, such as the hydroxyl, nitro, amino, halogen, alkoxy, and sulfo radicals, with a tertiary-hydroxyalkylamine of the type indicated by the general formula next above. In preparing these dyestuffs, the anthraquinone compound or its leuco form, is reacted with a suitable tertiary-hydroxyalkylamine in the presence of a solvent for the reactants, such as for example, pyridine, alcohol or water, at approximately the reflux temperature of the reaction mixture. Generally, the mixture is heated under reflux in the presence of air or other suitable oxidizing agent until oxidation of the resulting leuco compound, formed by the interaction of the leuco anthraquinone derivative and the tertiary-hydroxyalkylamine, is substantially completely oxidized to the quinoid form. Frequently, it becomes necessary or desirable to effect this oxidation step by bubbling air into the mixture in the presence of a suitable catalyst such as for example, a copper salt, viz., copper acetate, copper sulfate, or piperidine, and the like. In other instances, a relatively mild oxidizing agent such as nitrobenzene may be sufficient to effect a conversion to the quinoid, or less soluble, form. Certain of the dyestuffs of my invention when converted in the reaction mixture to the oxidized or quinoid form are soluble therein, however, they may, in general, be isolated by pouring the reaction mixture, which is in the form of a solution, into an excess of water whereupon the dye will generally be observed to precipitate in the form of brightly colored crystals. With various of the other dyestuffs produced in accordance with my invention, isolation of the desired tertiary-hydroxyalkylamino-anthraquinone may be effected by merely filtering the reaction mixture, and the dye obtained as a residue in the form of brightly colored crystals. In preparing the new dyes of my invention the course of the reaction to completion may generally be ascertained by periodic examination of a spot of the reaction mixture under the microscope, until no trace of the starting material is evident. Frequently the reaction time variable is determined by a series of comparative experiments, judging by product yield and quality.

With compounds of the anthraquinone series having a plurality of functional groups substituted throughout the aromatic structure it is possible to effect a substitution of one or more substituents in addition to, and different from the tertiary-hydroxyalkylamine substituted in the alpha position of the anthraquinone compound. Such different substituents may be derived from an ordinary primary amine or an alkylolamine different from the one substituted in the alpha position of the anthraquinone structure.

As examples of suitable tertiary-hydroxyalkylamines that may be used in the preparation of the dyestuffs of my invention, there may be mentioned 3-amino-2-methyl-1-phenyl-2-butanol, 3-amino-2-methyl-2-butanol, 2-amino-3-ethyl-3-pentanol, 1-(1-hydroxycyclohexyl)-ethylamine, 2-amino-3-methyl-3-hexanol, 2-amino-3,5-dimethyl-3-hexanol, 2-amino-3-methyl-3-pentanol, and the like.

As examples of suitable anthraquinone derivatives that may be employed in preparing the dyestuffs of my invention, there may be mentioned 1-chloro-anthraquinone, leucoquinizarine, 1-amino-4-bromo-anthraquinone-2-sodium sulfonate, 1-amino-2,4-dibromo-anthraquinone-5-sodium sulfonate, leuco-1,4,5-trihydroxy-anthraquinone, leuco-1,4,5,8-tetrahydroxy-anthraquinone, leuco-1,5-diamino-4,8-dihydroxy-anthraquinone, leuco-1,4-diamino-anthraquinone, leuco-1,4-amino-hydroxy-anthraquinone, and the like.

My invention may be further illustrated by the following specific examples:

Example 1

1-[N-(1,2-dimethyl-2-hydroxy)propyl] amino anthraquinone is prepared by refluxing for a period of eight hours, a mixture consisting of 15 parts of 1-chloro-anthraquinone, 40 parts of 3-amino-2-methyl-2-butanol and 10 parts of pyridine. The reaction mixture after heating for the aforementioned period forms a deep red solution, which on pouring into 300 parts of water, results in the procurement of the desired product as a bright red crystalline precipitate. The mixture, thus obtained, is filtered and the crystalline 1-[N-(1,2-dimethyl-2-hydroxy)propyl] amino anthraquinone is thoroughly washed with cold water and thereafter dried at 80° to 100° C. The dyestuff, thus produced, is soluble in organic solvents generally to give a characteristic red color, and when properly dispersed dyes acetate artificial silk bright, clear shades of red. The same compound can be prepared by heating together at 90° to 95° C. 10 parts of 1-nitro-anthraquinone, 20 parts of 3-amino-2-methyl-2-butanol in 60 parts of pyridine until nitro-anthaquinone can no longer be detected in the mixture. The product, thus obtained, may be isolated as described above. Alternatively, 1-[N-(1,2-dimethyl-2-hydroxy)propyl] amino anthraquinone may be prepared by heating together a mixture of 115 parts of anthraquinone-1-sodium sulfonate, 700 parts of a 7% aqueous solution of 3-amino-2-methyl-2-butanol and 22 parts of potassium bromate in an autoclave at 140–150° C. for ten hours. Similarly, 1-(tertiary-hydroxyalkylamino)-anthraquinones can be synthesized by substituting 2-amino-3-methyl-3-phentanol, 2-amino-3,5-dimethyl-3-hexanol, 1(1-hydroxycyclohexyl)-ethylamine, or other alkylol amines, containing a tertiary hydroxyl group, for the 3-amino-2-methyl-2-butanol used in the above examples to give dyestuffs capable of dyeing acetate artificial silk in varying shades of red.

Example 2

A mixture consisting of 60 parts of leucoquinizarin, 320 parts of ethyl alcohol and 38 parts of 3-amino-2-methyl-2-butanol is heated at reflux temperature for a period of four hours. Thereafter 35 parts of monomethylamine in the form of a 35% aqueous solution is next added and the resulting mixture again heated at reflux temperature for six hours. At the end of this time 0.2 part of copper acetate and 0.8 part of piperidine are added and air passed into the mixture with agitation until oxidation of the leuco compound is complete. The crystalline product, thus obtained, is then separated from the reaction mixture by filtration, washed with 300 parts of alcohol, the filter cake transferred to 1,000 parts of water containing 40 parts of sodium hydroxide and the resulting slurry heated to 80–90° C. for a period of about fifteen minutes. Thereafter the hot solution is filtered, the product washed thoroughly with warm water and then dried. The resulting 1-N-methylamino-4-[N-(1,2-dimethyl-2-hydroxy)propyl] amino anthraquinone in aqueous dispersion dyes cellulose acetate in strong, clear blue shades of excellent fastness. Substitution of the equivalent amount of 2-amino-3-ethyl-3-pentanol for the 3-amino-2-methyl-2-butanol yields 1 - N - methylamino-4-[N-(1-methyl-2-ethyl-2-hydroxy)butyl] amino anthraquinone which is likewise a very valuable blue dyestuff for cellulose esters and ethers. Similarly, dyes varying in shade from violet to blue or blue-green are prepared by condensing leuco-1,4,5-trihydroxy-, leuco-1,4,5,8-tetrahydroxy-, leuco-1,4-diamino-, leuco-1,4-aminohydroxy-, and leuco-1,5-diamino-4,8-dihydroxy-anthraquinone with a tertiary-hydroxyalkylamine of the type described above so as to replace one or both of the substituents in the 1 and 4 positions of the anthraquinones structure and subsequently oxidizing. Products of particular value are obtained when only 1 mol of the tertiaryhydroxyalkyl amine is introduced into the 1 or 4 positions and the remaining functional group, i. e., hydroxyl amino, etc., replaced by a simple alkyl amine.

*Example 3*

A mixture containing 5 parts of 1-amino-4-bromo-anthraquinone-2-sodium sulfonate, 25 parts of water, 2 parts of sodium bicarbonate, 5 parts of 3-amino-2-methyl-2-butanol and 0.1 part of copper sulfate is heated at reflux temperature for a period of approximately two hours. During this interval the color is observed to change from orange through purple to blue. After cooling, the mixture is acidified with dilute hydrochloric acid, saturated with common salt and thereafter filtered. The crude dye thus obtained is dissolved in water, made alkaline with sodium carbonate, filtered from a small amount of insoluble residue and the product recovered from the filterate. The dyestuff thus produced, 1-amino-2-sulfo-4-[N-(1,2-dimethyl-2-hydroxy) propyl] amino anthraquinone, dyes wool from an acid bath, strong blue-violet shades. In a similar manner, other violet to blue acid wool dyes are prepared by substituting 3-amino-2-methyl-1-phenyl-2-butanol, 2-amino-3-ethyl-3-pentanol, or other tertiary-hydroxyalkylamines for condensation with 1-amino-4-bromo-anthraquinone-2-sodium sulfonate or with 1-amino-2, 4-dibromo-anthraquinone sodium sulfonate in which the latter radical is in either the 5, 6, 7 or 8 position.

*Example 4*

A mixture of 25 parts of leuco-1,4-diamino-anthraquinone, 80 parts of ethanol and 65 parts of 3-amino-2-methyl-2-butanol is boiled under reflux until a microscopic examination shows reaction to be complete. One part of piperidine and 0.2 part of copper acetate are then added and a stream of air passed into the mixture to effect oxidation. The resulting 1,4-di-[N-(1,2-dimethyl-2-hydroxy) propyl] amino anthraquinone crystallizes from alcohol in dark blue needles. The dye thus produced is soluble in most organic solvents, oils and waxes.

The anthraquinone dyestuffs produced in accordance with the procedures specifically disclosed above and which contain one or more tertiary-hydroxyalkylamino groups are highly valuable materials for the dyeing of cellulose ethers and esters, oils, solvents, plastics and many other materials. By introducing a sulfonic acid group in the anthraquinone nucleus or by forming the sulfuric ester of the hydroxylalkylamino radical, the compounds are rendered soluble in water and are valuable as acid wool dyestuffs. By simple dehydration of the tertiary carbonyl group, unsaturated alkylamino-anthraquinone compounds are obtained. Additional uses of the compositions of my invention will be apparent to those skilled in the art.

What I claim is:

1. 1-[N - (1,2 - dimethyl - 2 - hydroxy)propyl] amino anthraquinone.
2. 1-N-methylamino - 4 - [N-(1,2-dimethyl-2-hydroxy)propyl] amino anthraquinone.
3. 1-amino-2-sulfo-4-[N-(1,2-dimethyl- 2 -hydroxy)propyl] amino anthraquinone.
4. Dyestuffs of the anthraquinone series having a single anthraquinone nucleus which is substituted in at least one alpha position of said nucleus by the grouping

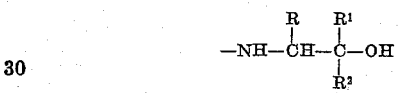

in which R is a member of the group consisting of —H and an alkyl group of from 1 to 4 carbon atoms, and $R^1$ and $R^2$ are members of the group consisting of aryl, alkyl and aralkyl.

5. Dyestuffs according to claim 4 in which the anthraquinone nucleus is substituted by the specified grouping in only a single alpha position.
6. Dyestuffs according to claim 4 in which the anthraquinone nucleus is substituted by the specified grouping in position 1 and in which the anthraquinone nucleus is substituted in position 4 by a member of the group consisting of —NH₂, —H, alkyl-NH—, aryl-NH—, and aralkyl-NH—.

RICHARD S. WILDER.

REFERENCES CITED

The following references are of record in the file of this patent:

UNITED STATES PATENTS

| Number | Name | Date |
|---|---|---|
| 1,854,460 | Dreyfus | Apr. 19, 1932 |
| 2,050,661 | Koeberle et al. | Aug. 11, 1936 |
| 2,346,771 | Lodge et al. | Apr. 18, 1944 |

FOREIGN PATENTS

| Number | Country | Date |
|---|---|---|
| 456,114 | Germany | Feb. 15, 1928 |